United States Patent

Lam et al.

[11] Patent Number: 5,546,144
[45] Date of Patent: Aug. 13, 1996

[54] TRANSPARENCY HOLDER

[75] Inventors: Kai Y. Lam, Torrance; Loi Han, Alhambra, both of Calif.

[73] Assignee: Microtek Lab, Inc., Redondo Beach, Calif.

[21] Appl. No.: 228,736

[22] Filed: Apr. 18, 1994

[51] Int. Cl.[6] ............................................. G03B 21/00
[52] U.S. Cl. .......................................................... 353/120
[58] Field of Search .......................... 353/120; 40/159.2, 40/159, 158.1, 157, 155

[56] References Cited

U.S. PATENT DOCUMENTS

| 3,928,717 | 12/1975 | Dorlard | 348/110 |
| 4,878,073 | 10/1989 | Hoousbeeu | 353/120 |

FOREIGN PATENT DOCUMENTS

| 1243415 | 6/1967 | Germany | 40/159.2 |
| 1284656 | 12/1968 | Germany | 40/159.2 |
| 2753479 | 6/1979 | Germany | 353/120 |
| 3437027 | 4/1986 | Germany | 40/159.2 |

Primary Examiner—William Dowling
Attorney, Agent, or Firm—Small, Larkin & Kidde

[57] ABSTRACT

A securing apparatus for an article, for example a film or slide, to be scanned in an image scanner has a top and a bottom cover. The top cover is provided with a top window permitting the scanning light emitting from the image scanner to pass therethrough. The bottom cover can be selectively collapsibly connected to the top cover. An insertion mechanism is changeably mounted between the top and bottom covers and is provided with a viewing window corresponding to the top window for securing the article between the windows. The windows permit the scanning light emitting from the image scanner to pass therethrough. The changeable insertion mechanism can be configured to accommodate any film or slide having different sizes or orientations.

17 Claims, 4 Drawing Sheets

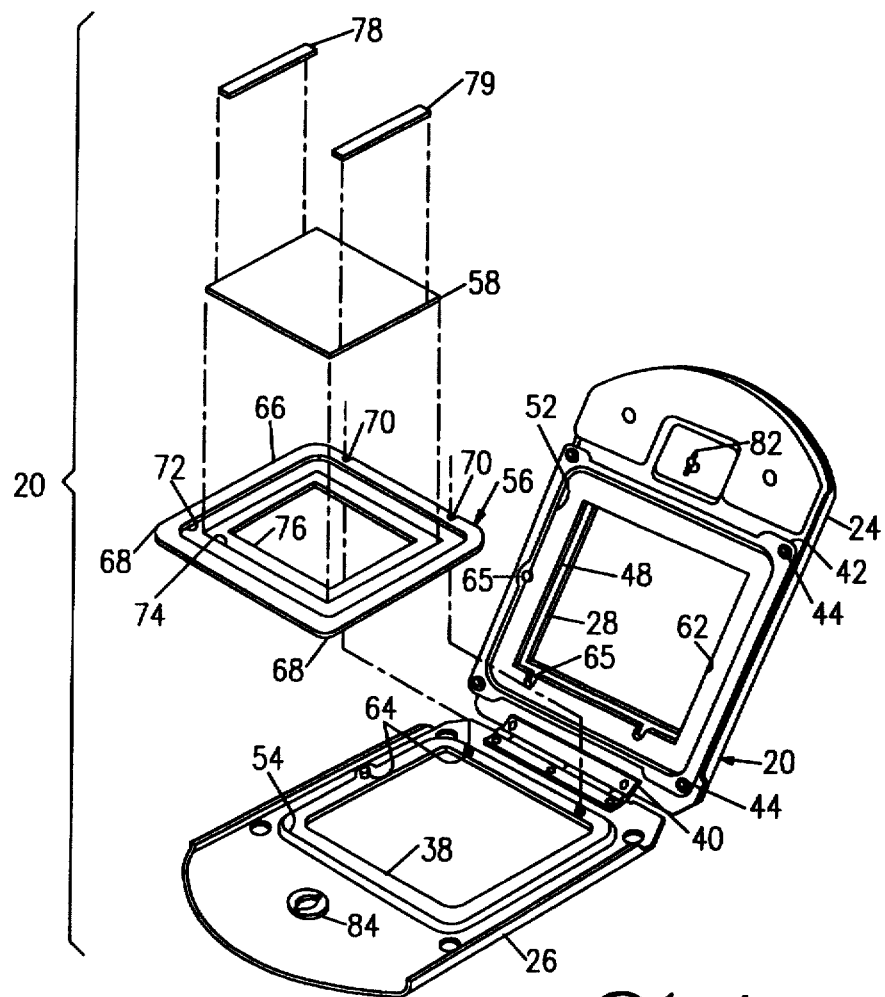
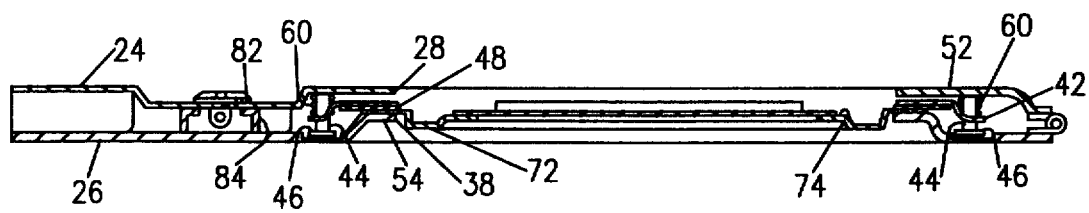

TRANSPARENCY HOLDER

BACKGROUND OF THE INVENTION

The present invention relates generally to a securing apparatus for an article to be scanned, and more particularly to a securing apparatus for an article, such as a film, a slide, or the like, for scanning in an image scanner that is used, for example, in graphic editing for advertisements or magazine publications.

In highly delicate printing used in the graphic arts for magazines, posters or advertisements, images or scenes on transparent film, slides, or the like are often used. The film or slide is generally secured in a securing apparatus, and then inserted into an image scanner for scanning. Once scanned, the image then can be edited and modified in a computer. However, conventional securing devices for the film or slide tend to be bulky, and are limited for specific applications.

OBJECTS AND SUMMARY OF THE INVENTION

An object of the present invention is to provide a securing apparatus for an article to be scanned in an image scanner, that utilizes a changeable holder or securing apparatus to accommodate articles of different sizes or orientations.

Another object of the present invention is to provide a securing apparatus for an article to be scanned that prevents lateral movement of the article and secures the article therein flatly and snugly.

A further object of the present invention is to provide a securing apparatus for an article to be scanned that prevents the article from being damaged during positioning of the article.

In accordance with the present invention, a securing apparatus for an article to be scanned in an image scanner includes generally a top cover provided with a first window adapted to permit light from the image scanner to pass therethrough; a bottom cover, having a scanning aperture, connects to the top cover; and a holding platform mechanically interlocked between the top and bottom covers in a changeable fashion. The securing apparatus further includes a second window in the platform aligned with the first window of the top cover, and means for securely holding the article between the windows. The second window is adapted to permit the scanning light emitting from the image scanner to pass therethrough to an image sensor.

The securing apparatus also includes a securing plate mounted on the top cover to be biased away from the top cover by springs and having a recessed region; and a protrudent region formed on the bottom cover and corresponding to the recessed region of the securing plate. A lip on the outer perimeter of the platform is secured between the recessed region and the protrudent region.

A third window is formed within the recessed region of the securing plate corresponding to the top cover window. The platform is provided with a recessed groove therein corresponding to the border of the third window and the bottom cover aperture. The holding platform may be a plurality of platforms for receiving a plurality of corresponding articles thereon, which can be secured between the top and bottom covers. The securing apparatus is adapted to permit the scanning light emitting from the image scanner to pass through the windows to an image sensor.

The top and bottom covers may be formed integrally. The securing apparatus further includes a hinge for collapsibly connecting the bottom cover to the top cover. The first window of the top cover may be an opening, and the article may be a film or a slide.

The plate may include a soft cushion arranged within the recessed region which compresses to prevent lateral movement of the platform. The bottom cover opening aperture includes therearound a plurality of positioning rods, and the platform includes therearound a plurality of positioning holes or notches for receiving the positioning rods therein, respectively, so as to facilitate the securing of the platform between the top and bottom covers for viewing therethrough. The holding platform, positioning rods, bottom cover protrudent region, and securing plate form an insertion mechanism and cooperate to function to secure the holding platform within the securing apparatus.

The present invention can be more fully understood by reference to the following description and accompanying drawings, which form an integral part of this application:

BRIEF DESCRIPTION OF THE DRAWING(S)

FIG. 4 is an exploded perspective view of the securing apparatus of the present invention;

FIG. 5 is a cutaway side view of the securing apparatus of the present invention taken along line 5—5 of FIG. 3;

DETAILED DESCRIPTION OF THE PREFERRED EMBODIMENT(S)

Figure 1:
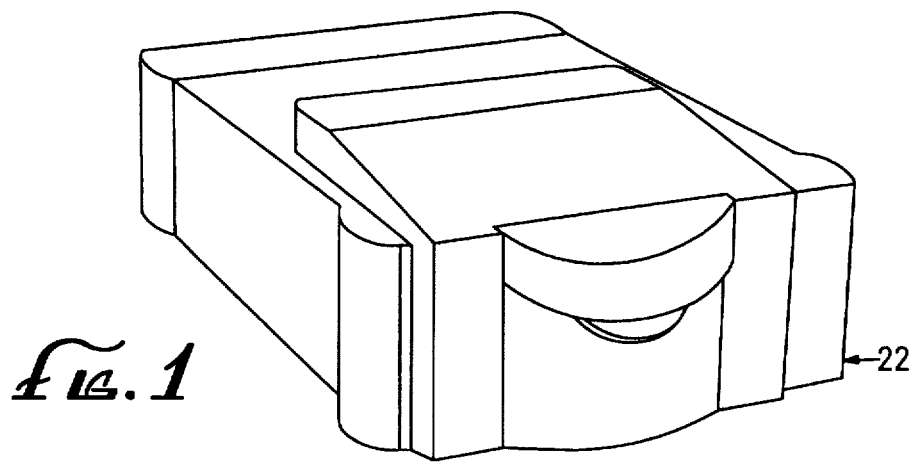
FIG. 1 is a perspective view of a conventional transmissive scanner for housing the apparatus of the present invention.
Figure 2:
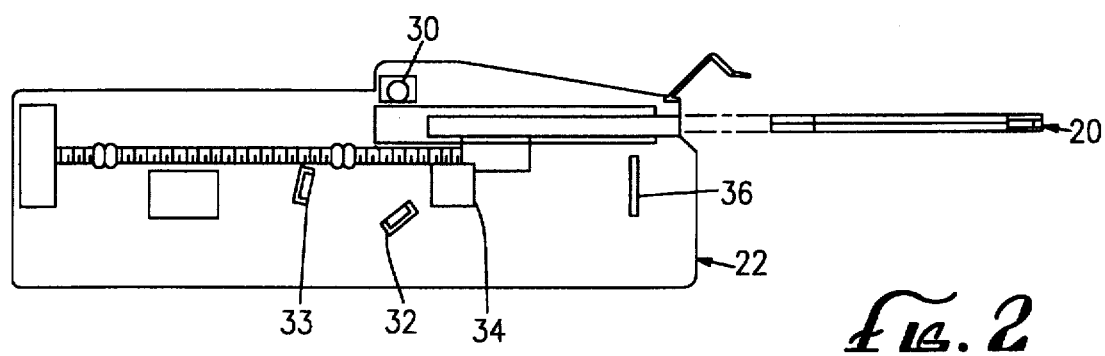
FIG. 2 is a cutaway side view of the conventional scanner housing and the apparatus of the present invention.
Figure 3:
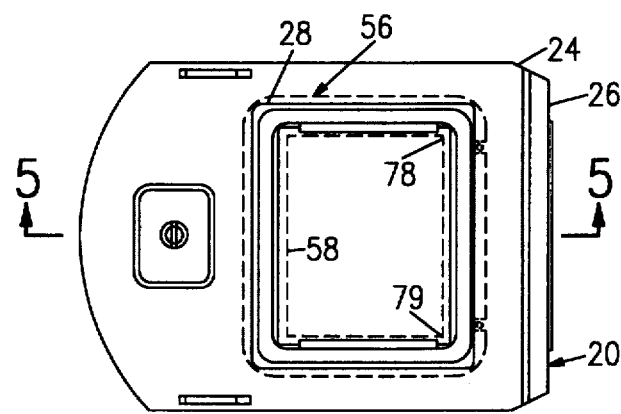
FIG. 3 is a top view of the securing apparatus of the present invention.

Referring to FIGS. 1–4, there is shown generally a securing apparatus 20 for an article to be scanned in a conventional image scanner 22. The securing apparatus (FIG. 4) includes a surrounding cover formed from a top cover 24 and a bottom cover 26. The top cover 24 is provided with a first window, having a large opening 28, in the preferred embodiment, FIGS. 3 and 4, that is adapted to permit the scanning light emitted from a light 30 in the image scanner (FIG. 2) to pass through the apparatus 20 a set of mirrors 32 and 33, through a lens 34, and to a conventional image sensor 36, such as a charged coupled device (CCD). The bottom cover 26 (FIGS. 4 and 5), having a scanning aperture 38, is collapsibly connected to the top cover 24 by a hinge 40 at the distal end in the preferred embodiment although any other suitable securing means may be used. A securing frame or plate 42 is movably secured to the top cover by four posts 44 extending from the top cover through apertures in the four corners of the plate to connect with locking washers 46. The plate includes a central window 48 corresponding with opening 28 and a recessed region 52 forming a recessed frame about the central aperture 48.

A protrudent region 54 is formed on the bottom cover complementary to the recessed region 52 of the securing plate. It should be understood that the protrudent region 54 may also be formed as a separate member movably secured to the bottom cover 26 in a similar manner as the securing plate 42. The securing plate 42 and the protrudent region 54 cooperate to form a changeable insertion holder. A first mount platform 56 for securing an article 58, for example a film or a slide, is placed between the recessed region 52 and the protrudent region 54.

A coil spring 60 is arranged concentrically around each post 44, and compressed between the securing plate 42 and the top cover 24, shown in FIG. 5. The springs function to bias the recessed region 52 against the protrudent region 54 firmly when the top cover 24 is collapsed and secured to the bottom cover 26.

A rubber gasket 62 (FIG. 4) having the same dimensions of the frame formed by the recessed region is secured by glue or other suitable means to the recessed region. A plurality of platform securing rods 64 extend above the protrudent region and engage with corresponding rod apertures 65 in the recessed region of the securing plate. The gasket 62 and securing rods 64 cooperate to prevent lateral movement of the platform 56 within the holder.

The platform 56 (FIG. 4) is generally of a rectangular shape having a lip 66 about the outer perimeter of the platform for securing the platform between the recessed region of the plate and the protrudent region 54 of the bottom cover. The corners 68 of the platform are rounded to prevent damage to any articles, such as film, should the platform be dropped over the articles when mounting. The overall dimensions are intended to simplify mounting of articles over the platform.

Figure 6:
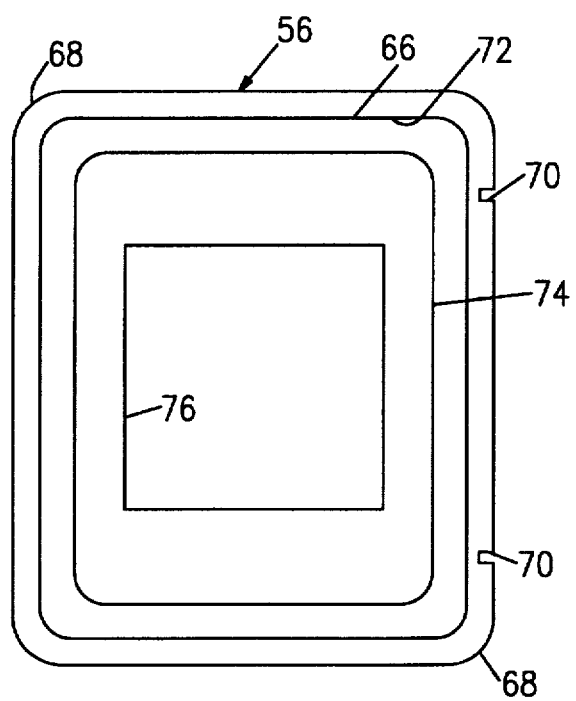
FIG. 6 is a top view of a securing plate for use in the securing apparatus of the present invention.

The platform FIGS. 4 and 6 further includes notches 70 which are positioned about the perimeter to align with the rods 64 for securing the platform within the holder. A recessed groove 72 formed in the platform having a rectangular configuration fits within the aperture formed in the protrudent region of the bottom cover. A center region 74 extends above the recessed groove to form a rectangular center plane in the preferred embodiment for mounting film. The height of the center region 74 is configured to position the article to be scanned at the best scanning latitude within the scanner. An article window 76 is centrally positioned within the central region. A pair of magnets 78 and 79 or other suitable device for releasably securing an article is located about the perimeter of the center region 74. The magnets function as means for securing an article to the platform.

The article window 76 is provided in the center region 74 and is adapted to permit the scanning light emitting from the light source of the image scanner to pass therethrough. The top cover 24 can be releasably engaged to the bottom cover 26 by any suitable means for engaging the covers, for example the combination of a rotatable tenon button 82 and a mortise 84, shown in FIGS. 3, 4 and 5, located away from the hinged connection at proximate ends on the respective top and bottom covers.

Figure 7:
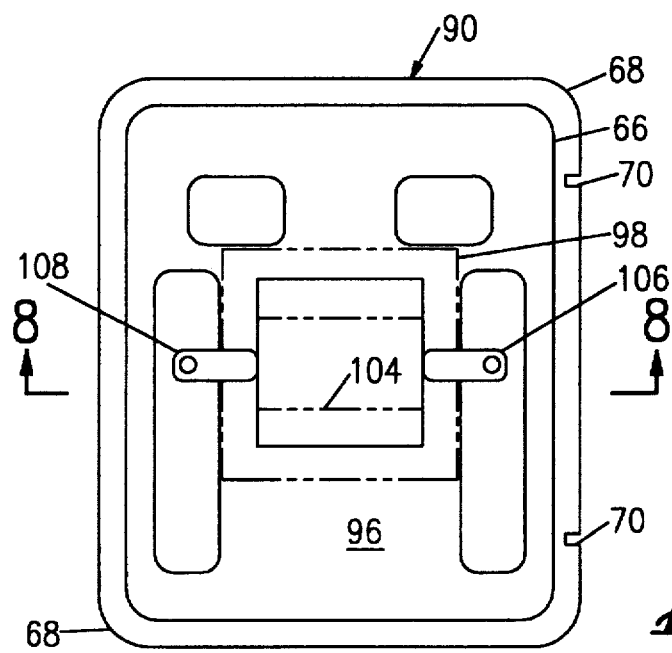
FIG. 7 is a top side view of an alternative securing plate of the present invention.
Figure 8:
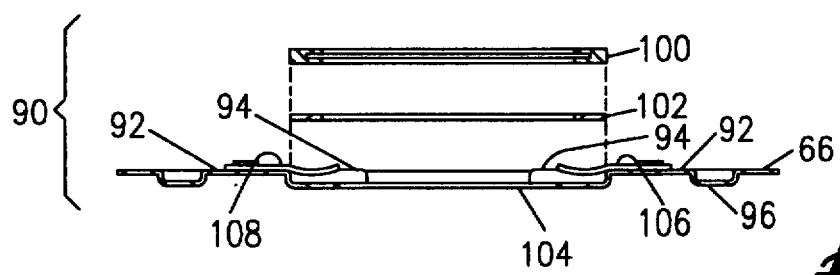
FIG. 8 is an exploded cutaway side view of the securing plate of FIG. 7 taken along line 8—8.
Figure 9:
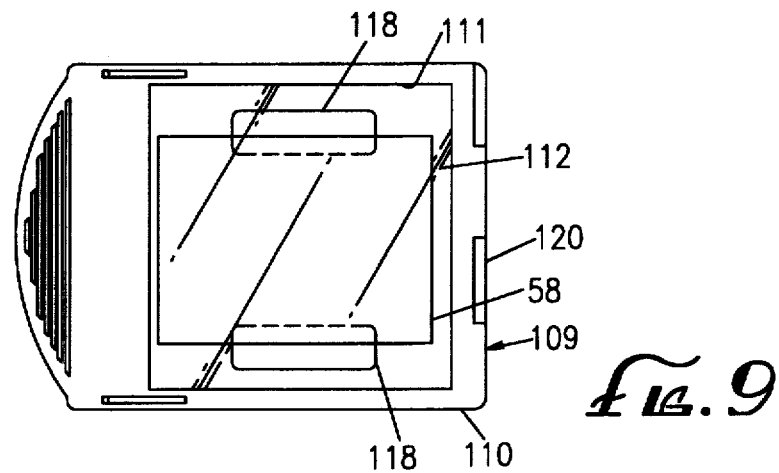
FIG. 9 is a top side view of an alternative embodiment of the present invention.
Figure 10:
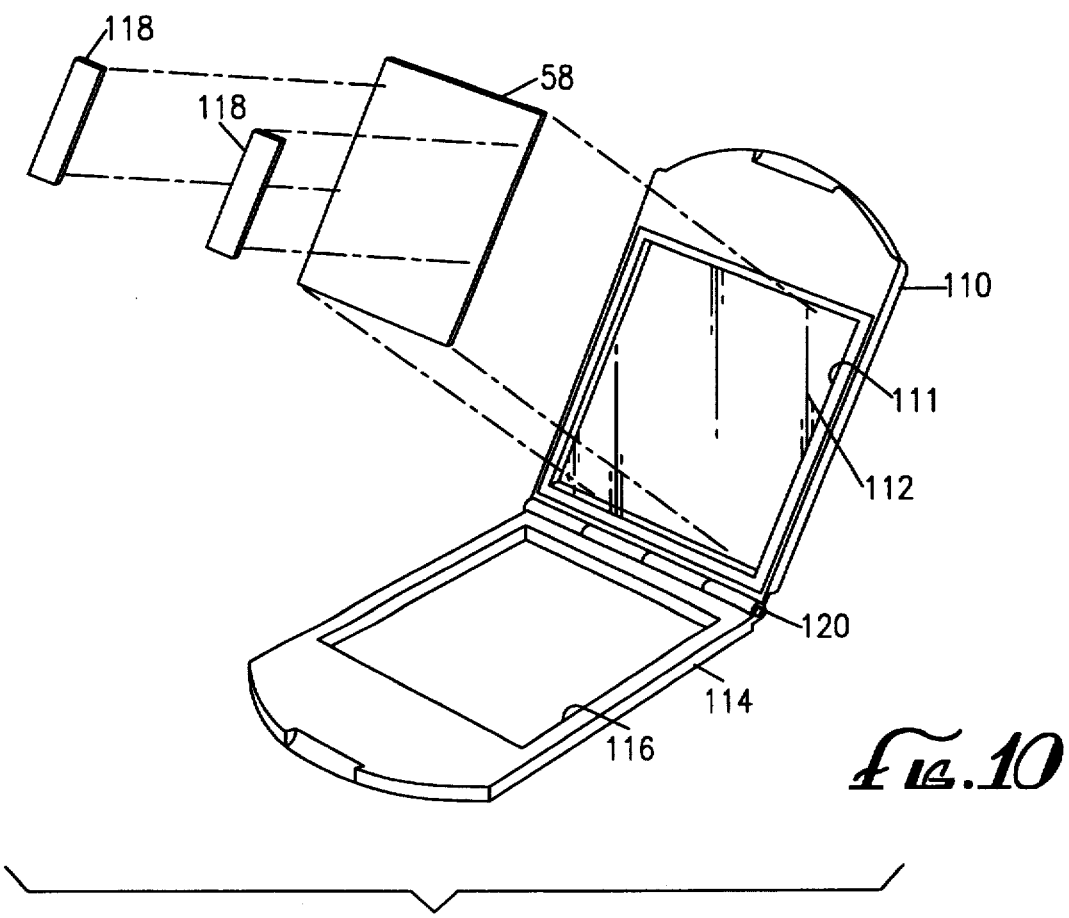
FIG. 10 is an exploded perspective view of the alternative embodiment of the present invention.

Referring to FIGS. 7 and 8, an alternative or second platform 90 for securing an article such as a mounted slide according to the present invention is quite similar to the first platform 56 except that the article is directly secured to the platform 90. Protrusion guides 92 and stops 94 define a central recess 96 in which the article 98, such as a mounted slide having a frame 100 and slide 102, may be positioned overlying a central opening 104. Clips 106 and 108 riveted to respective protrusion guides overlie the central recess. The article can be clipped flatly and snugly over the central opening 104. The second platform 90 is then secured in the securing apparatus in the same manner as the first platform. While only two platforms have been described, platforms may be tailored to any specific article configuration.

In Operation:

The article to be scanned is mounted upon the appropriate platform for the article. In the case where a transparent film is to be scanned then the first type of platform 56 may be selected. The article window 76 size of the platform is selected to correspond with the size of the film. The film is then secured over the window by the pair of magnets 78 and 79. Any releasable securing means can be used although magnets will not soil the film as tape or the like would if applied. If a mounted slide is to be scanned then the second platform 90 may be used. For other types of media or mounted film, those skilled in the art will appreciate that other types of mounts are available. The only requirement is that the platform contain a lateral planar surface for maintaining the article to be scanned on a predetermined lateral region in the scanner to ensure the article is in focus. By mounting the article on a platform away from the covers, those skilled in the art will appreciate that alignment of the article is easily performed.

Once the article is secured to the platform with the hinged top and bottom covers opened to reveal the securing plate and protrudent region, the platform notches 70 are aligned with the rods 64 ensuring the platform is properly positioned in the securing apparatus. Closing the top cover over the bottom, securely holds the platform between the cushioned, spring-biased, securing plate 42 and the protrudent region 54 of the bottom cover. The rotatable latch formed from the tenon 82 and mortise 84 is then locked securing the platform within the securing apparatus. The article is now ready to be inserted in the scanner. By providing a plurality of platforms for the securing apparatus, it can be seen that several articles may be scanned using one scanning apparatus. Thus, the need for a tailored scanning apparatus for each type of media or each type of commercial scanner is reduced or eliminated. It can also be seen that the platform lip 66, dimensions and notches 70 form a standard configuration in which any type of scanner securing apparatus may be adapted to hold the same platform thereby providing interoperability between different scanner models. Articles which are continuously scanned or used in different scanners having differing covers may be aligned in a platform for repeated use in multiple scanners.

In a second preferred embodiment of the securing apparatus 109, a top cover 110 having a window 111 includes a glass platen 112 rigidly mounted against the window. The bottom cover 114 includes an aperture 116 of equal size, with the top cover aperture. The article to be scanned is releasably mounted against the glass platen 112 by adhesive tape 118 or other similar adhesive to secure the film against the platen with out leaving a residue such as tape manufactured under Model No. I-37002142, by Westin Label Co., 5305 Alhambra Avenue, Los Angeles, Calif. 90032. The covers 110 and 114 are rotatably attached at one end by a hinge 1120 and securing means comprising friction fittings (not shown) at the opposite end. The covers may be manufactured from metal, rigid plastic or any other substance which will rigidly maintain the article at a given lateral position within the scanner.

In a third embodiment (not shown), the top cover having the securing plate of the first embodiment includes side walls each having an inner protruding lower lip forming guide rails. The spring biased securing plate includes a latch for securing the plate in a non-biased position against the top cover. With the plate in a non-biased position the platform easily slides along the guide rails and aligns the notches with rods extending down from the top cover. The latch may be released and the securing plate is then biased against the platform to restrict lateral movement. The plate may be latched in a non-biased position again by pressing the platform against the top cover thereby latching the plate against the cover.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A securing apparatus for securing a variety of articles to be scanned in an image scanner having a light source and image sensor comprising:

a top cover having a top window for receiving light from a light source through said top window;

a bottom cover underlying said top cover;

means for securing said top and bottom cover; and holding means selectively mounted between said top and bottom covers and having an article window, said holding means securing at least one of said variety of articles to be scanned over said article window such that light from said light source passes through said article and intercepts said image sensor.

2. A securing apparatus as claimed in claim 1 wherein:

said holding means includes a plurality of platforms, each platform being adapted for supporting at least one of said variety of articles whereby when one of said variety articles is to be scanned a platform configured to hold said article is positioned between said top and bottom cover.

3. A securing apparatus as claimed in claim 2 wherein:

said securing means includes a hinge coupled to said top and bottom cover at a distal end for rotatingly collapsing said top cover over said bottom cover and a latch selectively connecting to said top cover and bottom cover at a proximate end when said top cover is located over said bottom cover such that said latch and said hinge secure said platform between said top and bottom covers.

4. A securing apparatus as claimed in claim 2 wherein:

said platforms are magnetic and said holding means includes magnets attached to said platforms for securely holding at least one of said variety of articles in between.

5. A securing apparatus as claimed in claim 2 wherein:

said holding means includes adhesive tape attached to said platforms for securely mounting at least one of said variety of articles inbetween.

6. A securing apparatus as claimed in claim 1 wherein:

said holding means includes a glass platen mounted centrally within said bottom cover and adhesive tape attached to said glass platen and said articles for securing said articles between said top and bottom covers.

7. A securing apparatus as claimed in claim 3 wherein:

said latch includes a tenon and mortise.

8. A securing apparatus as claimed in claim 1 wherein:

said top cover includes a securing plate movably connected to said top cover and biasing means for securely biasing said holding means between said top and bottom covers.

9. A securing apparatus as claim in claim 2 for use with articles being slides wherein:

said platforms include clips for securely holding said slide against said article window.

10. A securing apparatus for securing a variety of articles to be scanned in an image scanner having a light source and an image sensor comprising:

a cover having a cover window projecting therethrough including a top cover, a bottom cover and means for securing said top and bottom covers in overlying relationship;

holding means securely positioned in said cover between said top and bottom cover and aligned with said cover window for holding at least one of said variety of articles to be scanned;

a securing frame movably connected to said top cover and including a cushion for contacting said securing frame against said holding means;

biasing means for biasing said securing frame against said holding means and said bottom cover to thereby secure said holding means from lateral movement and permit light to pass through at least one of said variety of articles onto said image sensor.

11. A securing apparatus for securing a variety of articles to be scanned in an image scanner comprising:

a cover adapted to fit into said scanner;

holding means secured within said cover for holding at least one of a variety of articles;

a securing frame movably coupled in said cover and selectively contacting said holding means;

biasing means for biasing said securing plate in contact with said holding means.

12. A securing apparatus for securing a variety of articles to be scanned in an image scanner having a light source and image sensor comprising:

a top cover having a top window for receiving light from a light source through said top window;

a bottom cover underlying said top cover;

means for securing said top and bottom cover; and a holder selectively mounted between said top and bottom covers and having an article window, said holder adapted to secure at least one of said variety of articles to be scanned over said article window such that light from said light source passes through said article and intercepts said image sensor, said holder includes a plurality of platforms, each platform being adapted to support at least one of said variety of articles whereby when one of said variety articles is to be scanned a platform configured to hold said article is positioned between said top and bottom cover.

13. A securing apparatus as claimed in claim 12 wherein:

said platforms are magnetic and said holder includes magnets attached to said platforms such that at least one of said variety of articles is secured in between.

14. A securing apparatus as claimed in claim 12 wherein:

said holder includes adhesive tape attached to said platforms such that at least one of said variety of articles is secured in between.

15. A securing apparatus for securing a variety of articles to be scanned in an image scanner having a light source and image sensor comprising:

a top cover having a top window for receiving light from a light source through said top window;

a bottom cover underlying said top cover;

means for securing said top and bottom cover; and an holder selectively mounted between said top and bottom covers and having an article window, said holder adapted to secure at least one of said variety of articles to be scanned over said article window such that light from said light source passes through said article and intercepts said image sensor, said holder includes a glass platen mounted centrally within said bottom cover and adhesive tape attached to said glass platen and said articles such that said articles are secured between said top and bottom covers.

16. A securing apparatus for securing a variety of articles to be scanned in an image scanner having a light source and image sensor comprising:

a top cover having a top window for receiving light from a light source through said top window;

a bottom cover underlying said top cover;

means for securing said top and bottom cover; and an holder selectively mounted between said top and bottom covers and having an article window, said holder adapted to secure at least one of said variety of articles to be scanned over said article window such that light from said light source passes through said article and intercepts said image sensor, said top cover includes a securing plate movably connected to said top cover and biasing means for securely biasing said holder between said top and bottom covers.

17. A securing apparatus as claimed in claim 12 for use with slides wherein:

said platforms include clips such that said slide is secured against said article window.

* * * * *